July 2, 1929.  J. R. GAMMETER  1,719,218
APPARATUS FOR VULCANIZING RUBBER ARTICLES
Filed June 7, 1926   2 Sheets-Sheet 1
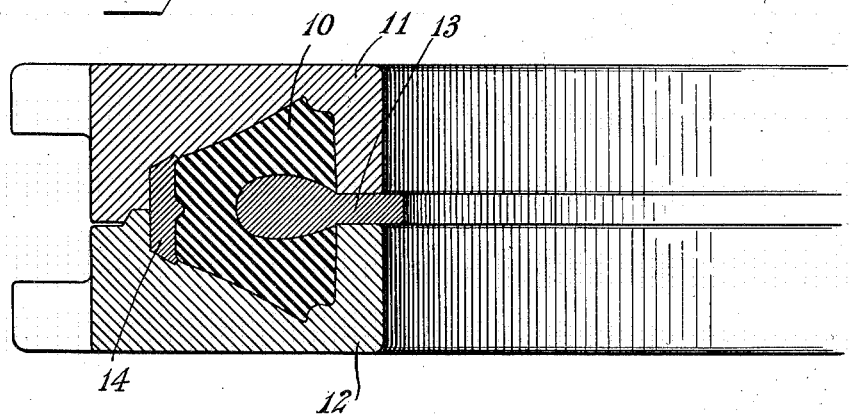
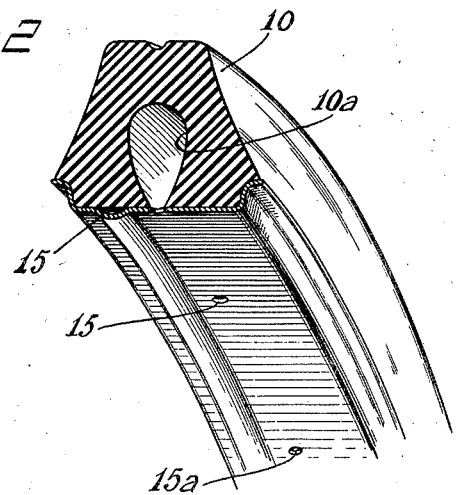
Inventor
John R. Gammeter
By Pierson, Eskin & Avery
Attys.

July 2, 1929.  J. R. GAMMETER  1,719,218
APPARATUS FOR VULCANIZING RUBBER ARTICLES
Filed June 7, 1926   2 Sheets-Sheet 2
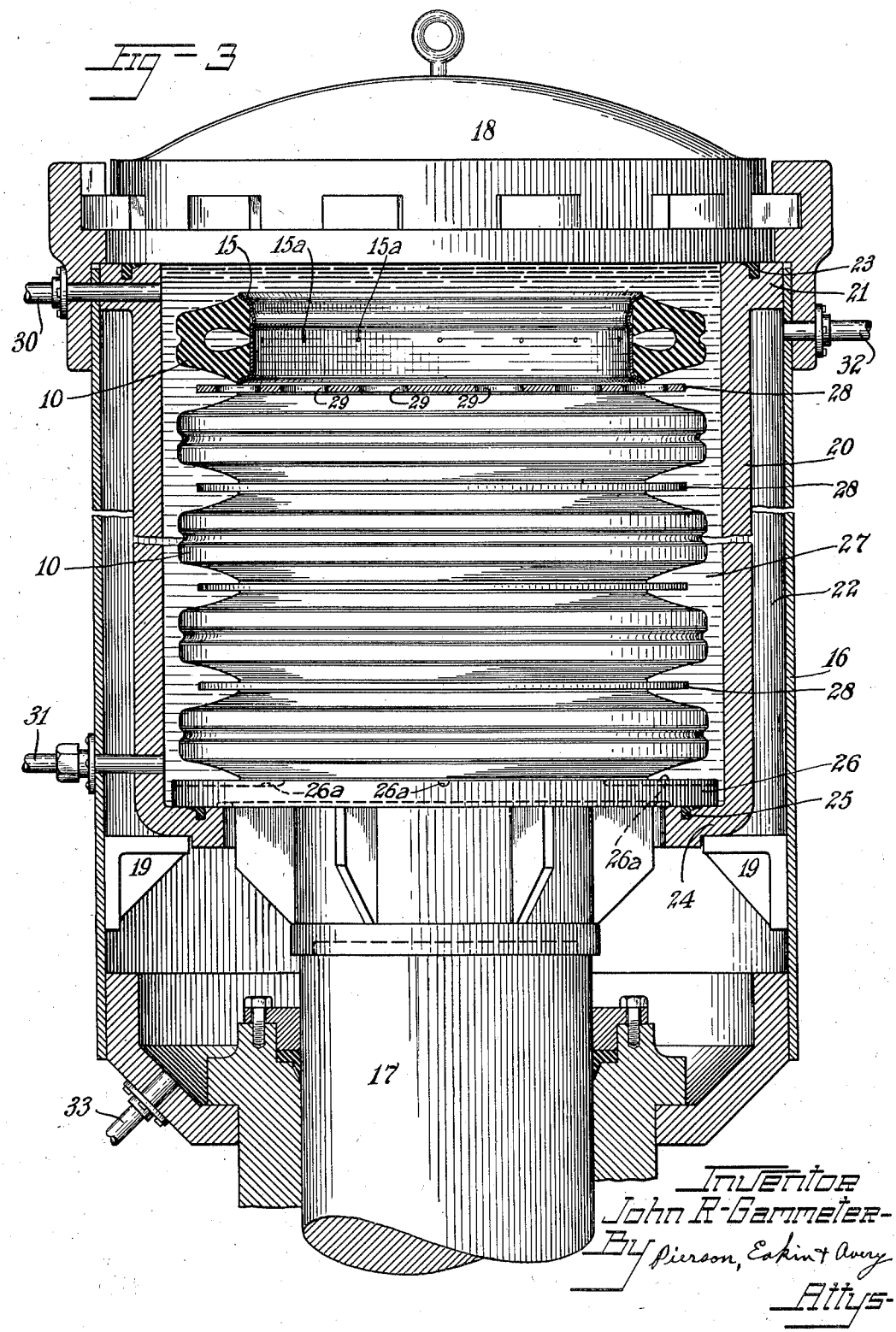

Patented July 2, 1929.

1,719,218

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

APPARATUS FOR VULCANIZING RUBBER ARTICLES.

Application filed June 7, 1926. Serial No. 114,052.

This invention relates to the art of molding and vulcanizing rubber articles such as solid or other vehicle tires, for example, and its chief objects are economy of molding and vulcanizing equipment and the production of rubber articles having the desirable wear-resisting qualities which have been found to exist in articles vulcanized in direct contact with water under high pressure.

Of the accompanying drawings:

Fig. 1 is a fragmentary, sectional view of a tire mold and a tire therein, illustrating an early step in the practice of my invention.

Fig. 2 is a perspective view of a sectioned part of the tire as molded and a rim upon which the tire is mounted.

Fig. 3 is a vertical section of a vulcanizer adapted for the performance of the final vulcanizing step of my process.

Referring to the drawings, in which cushion tires 10, 10 are shown by way of illustration, the tire is first molded and given a "set" cure, as in the molding apparatus of Fig. 1, including the usual mold sections 11, 12, sectional core 13 and sectional tread-molding ring 14. The tire may be given only such vulcanization in the mold as to cause it to retain its shape while the vulcanization is completed with the tire substantially unconfined in a fluid such as water.

The tire is then removed from the molding apparatus and mounted upon a rim 15, as in Fig. 2, which rim, as shown, may be of the type employed for pneumatic tires, and the vulcanization is then completed with the tire and rim submerged in water which is preferably maintained at a pressure greater than that due to its temperature. The rim 15 is preferably formed with apertures 15ª, 15ª to permit the fluid to enter the internal cavity 10ª of the tire in the case of a cushion tire, to balance the internal and external pressures and thus avoid collapse of the tire.

Suitable apparatus for the final vulcanizing step is shown in Fig. 3, in which 16 is the shell of a vertical tire vulcanizer having a hydraulic ram 17 adapted to clamp a stack of tire molds such as heretofore have been commonly used against the cover 18 of the vulcanizer, which is of the usual breech-block type.

Supported within the shell 16 by brackets 19, 19 is a large sleeve 20 which is formed at its upper end with an external spacing flange 21 secured and sealed to the shell 16, the main body of the sleeve standing away from the shell 16 so as to provide an annular steam chamber 22. The upper edge face of the sleeve is provided with an annular gasket 23 adapted to seal it against the vulcanizer cover 18 when the latter is in place and the lower end of the sleeve is formed with an internal flange 24 provided upon its upper face with an annular gasket 25 adapted to seal it against the lower face of the head 26 of the ram 17, the said head 26 being imperforate, so that the cover 18, sleeve 20 and ram head 26 enclose an inner chamber 27 within the vulcanizer, when the ram is lowered and the cover is in place, and yet the ram may be raised to lift from the vulcanizer a stack of the tires 10 and rims 15 mounted upon the ram. Plates 28, 28, preferably perforated as at 29, 29 for lightness and to permit circulation of a heating and pressing fluid through the stack of tires are interposed between the successive tires to maintain them out of contact with each other and in orderly arrangement, the upper face of the ram head 26 being formed with radial grooves 26ª, 26ª to permit circulation of the heating fluid.

Pipes 30, 31 traversing the walls of the shell 16 and sleeve 20 are provided for circulating a heating and pressing fluid such as water through the inner chamber 27 occupied by the tires, and pipes 32, 33 are provided for circulating a heating fluid such as steam through the outer chamber 22.

The operation of the apparatus to perform the final vulcanizing step, in which water at the vulcanizing temperature and high pressure is preferably used as the heating and pressing medium in contact with the tires, will be obvious from the foregoing.

The preliminary setting of the rubber in the molds gives the tires accurate contour which is preserved in the final cure by the high pressure of the water and by the stiffness of the "set up" stock, and the high pressure of the water prevents "blowing" of the rubber during the final cure. A large output of tires may be had with a given mold equipment and the vulcanizer is adapted for convenient mounting and removal of the tires. The high pressure of the water may be maintained throughout the cure, so that every part of the tire may be continuously subjected to an exactly regulated pressure independent of the vulcanizing temperature.

My invention is susceptible of modification within its scope and I do not wholly limit my claims to the specific procedure or apparatus described.

I claim:

1. Vulcanizing apparatus comprising a chamber, a steam-jacket communicating therewith, a ram extending from below into and having its head within the chamber for raising and lowering the work therein, the chamber wall being formed with an annular flange portion extending inward under the ram head and adapted to seal against the lower face of the latter to separate communication of the chamber from the steam-jacket.

2. Apparatus as defined in claim 1 including a set of spacer members adapted to be assembled on the ram head in alternation with a plurality of rubber vehicle tires for supporting the latter with their rubber surfaces exposed and out of contact with each other and for permitting circulation of fluid in the chamber about the tires.

In witness whereof I have hereunto set my hand this 3rd day of June, 1926.

JOHN R. GAMMETER.